United States Patent [19]

Valdespino

[11] Patent Number: 4,478,177
[45] Date of Patent: Oct. 23, 1984

[54] INTERNAL COMBUSTION ENGINE

[76] Inventor: Joseph M. Valdespino, 5023 Golf Club Pkwy., Orlando, Fla. 32808

[21] Appl. No.: 449,517

[22] Filed: Dec. 13, 1982

Related U.S. Application Data

[63] Continuation-in-part of Ser. No. 164,038, Jun. 30, 1980, abandoned.

[51] Int. Cl.³ .............................................. F02B 43/08
[52] U.S. Cl. ...................... 123/1 A; 123/3; 123/406; 123/575
[58] Field of Search .................. 123/1 A, 3, DIG. 12, 123/527, 575, 406

[56] References Cited

U.S. PATENT DOCUMENTS 2,140,254  12/1938  Zavra ................................. 123/545
4,013,050   3/1977  Lace .................................. 123/406
4,230,072   4/1980  Noguchi et al. ..................... 123/575

Primary Examiner—Craig R. Feinberg
Attorney, Agent, or Firm—William M. Hobby, III

[57] ABSTRACT

An improvement to an internal combustion engine (10, 90) having a fuel system for feeding a fuel-air mixture to the combustion chambers which utilizes ammonia gas as an auxiliary fuel which is partially dissociated and added to the fuel-air mixture of the engine (10, 90). The dissociated ammonia allows the engine to have its fuel-air ratio leaned down well below the misfire limits of hydrocarbon fuel and air to thereby improve the mileage of a vehicle and reduce certain pollutants in the exhaust of the engine. The ammonia is stored in a liquefied state under pressure in a storage container (24, 98) and is fed to a dissociator (28) including a heater (30, 106) using heat from the engine's exhaust and a catalyst chamber (31, 107) and is then fed to the engine (10, 90). The partially dissociated ammonia being fed to the engine is metered simultaneously with the changing of the fuel-air mixture and is controlled to lean the normal fuel-air mixture down.

8 Claims, 5 Drawing Figures

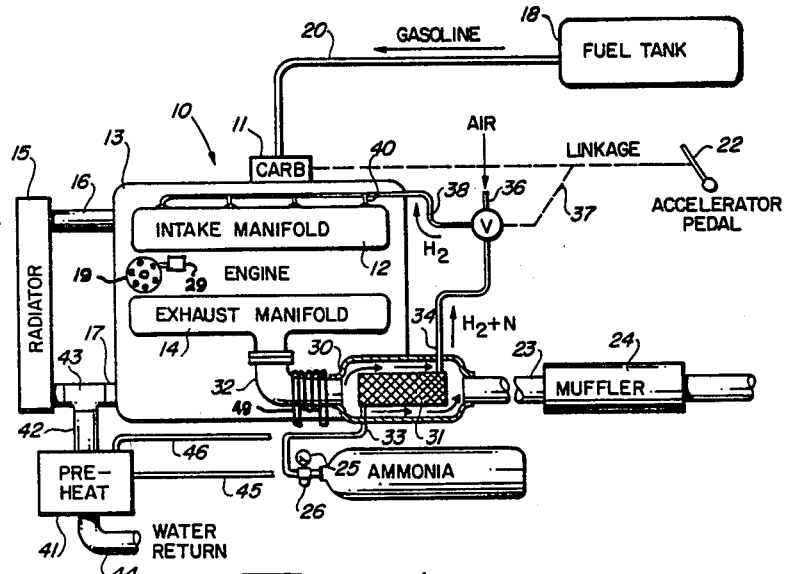
FIG. 1
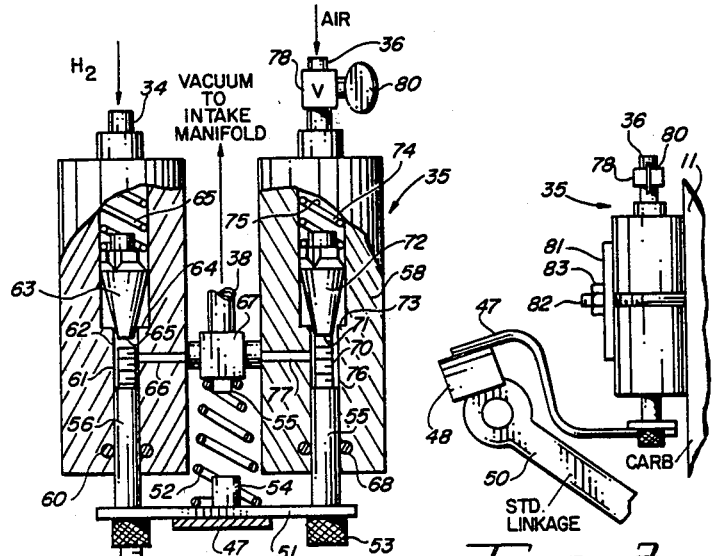
FIG. 2
FIG. 3

INTERNAL COMBUSTION ENGINE

This invention is a continuation in part of my invention in my co-pending U.S. patent application for an Internal Combustion Engine, Ser. No. 164,038, filed on June 30, 1980 now abandoned.

BACKGROUND OF THE INVENTION

1. Field of the Invention

The present invention relates to internal combustion engines and especially to improvements in internal combustion engines having an auxiliary ammonia gas feed metering gas through a dissociation system into the combustion chambers along with the normal hydrocarbon fuel-air mixture of the engine while leaning the engine below its normal operating fuel-air mixture.

2. Description of the Prior Art

In the past, a variety of internal combustion engines have been provided and typically these engines have a system for feeding a hydrocarbon fuel, such as gasoline mixed with air into the combustion chamber for running the engine. Such engines typically also have an electrical system which includes a generator or an alternator which may be connected through an electrical regulating circuit for charging a storage battery and for operating the electrical components of the engine of the vehicle. Internal combustion engines sometimes have hydrocarbon fuels mixed with air in a carburetor where the mixture is distributed into the combustion chambers of the engine. It is also typical to feed the air to the combustion chambers using a fuel injection system for injecting fuel directly into the combustion chambers. The present invention can be adapted to operate with either a carburetor or fuel injection system.

A variety of hydrogen fueled engines have been suggested in the past, including those using combinations of hydrogen and oxygen, which in some cases are generated in an electrolytic cell having an electrolyte including solutions of salts, acids or bases in water. The electrolytic cell breaks the water down between hydrogen and oxygen through electrolysis and the hydrogen or the hydrogen and oxygen in combination can then be used to run the engine. The advantage of the hydrogen and oxygen as fuel is that it is an efficient fuel which generates no pollution in that the combustion forms water in very minute quantities. Such engines, however, have not been brought into general use because of the inefficiency in the generation of hydrogen and oxygen through electrolysis which takes far more power than can be generated from the hydrogen and oxygen used as a fuel, even in high efficiency engines.

It has also been suggested to use small amounts of hydrogen added to the hydrocarbon fuel-air mixture to increase the efficiency or reduce the pollution of the internal combustion engine. One prior patent, U.S. Pat. No. 3,906,913, discusses in detail the advantages of the use of small amounts of hydrogen with the hydrocarbon fuel-air mixture of a vehicle and points out that the advantages of reduced pollution and increased mileage result from running the engine much leaner than can otherwise be accomplished because the misfire limit for hydrocarbon fuels can be well exceeded. The carbon monoxide and $NO_x$ (oxides of nitrogen) emissions have been found to decrease as the fuel-air ratio is made leaner and if the fuel-air ratio can be made sufficiently lean, it can be made substantially free of CO and $NO_x$. This patent shows a hydrogen generator and means to control the feed of the hydrogen to the engine so that the conventionally fueled engine can be run very lean, well below where the engine would normally misfire as the engine approaches the flammability limit of the fuel. The normal flammability limit for hydrogen fuel-air mixtures occurs with a relatively high $NO_x$ formation rate and thereby imposes severe limitations on the lean limit operation for the fuel. Since hydrogen exhibits a flammability limit well below that of conventional hydrocarbon fuels, it is possible to reduce the $NO_x$ simply by using the hydrogen to change the fuel-air mixture to a much leaner mixture than would normally be allowed. The extension of the misfire limit to very lean equivalence ratios with hydrogen fuel also yields significant increases in the thermodynamic efficiency of the combustion process, thereby allowing a substantial increase in the mileage obtained on a conventional internal combustion fueled engine vehicle.

The difficulties in using hydrogen either as the sole fuel or in combination with a conventional internal combustion engine results from the hydrogen being a ubiquitous and very flammable gas, so that storage increases the hazards of operating the engine and in the general inefficiency in generating the hydrogen such as through electrolysis on the vehicle.

The present invention is directed toward the use of an ammonia gas used in combination with a conventional hydrocarbon fuel-air mixture to increase the efficiency of the engine and to reduce pollution in the engine. Ammonia has been mentioned as a constituent of various types of fuels in the past, both for internal combustion engines and for jet propulsion. One such fuel is a liquid mixture of ammonious nitrate in liquid ammonia which is a self-sustaining fuel combination requiring no addition of an oxident such as air. Ammonia is also used to manufacture hydrozene, a well known rocket fuel, and while ammonia does not support combustion, it will burn when mixed with oxygen in air to give a variety of products, principally nitrogen and water. Mixtures of nitrous oxide and ammonia in a rate of 3 to 2 will detonate with some violence yielding nitrogen and water.

One prior U.S. Patent showing the use of ammonia as constituent in fuel for internal combustion engines can be seen in the Drouilly U.S. Pat. No. 2,559,605, for a fuel mixture for internal combustion engines. In this patent, ammonia gas is fed from one storage cylinder into a pressure reducing chamber and a second bottle containing an auxiliary gas, such as ethanized illuminating gas, is fed into a second expansion chamber and the two gases are then fed into a mixing chamber, and from the mixing chamber into a carburetor. This patent also discusses the use of carbomonoxide, methyl ether, ethyl ether, methyl amine and ethyl amine in combination with ammonia. In the U.S. Pat. to Meyer, No. 1,671,158, a fuel for use in internal combustion engines consists of a mixture of hydrocarbon distillates with ether and a highly volatile basic material, which may be ammonia. The mixture can then be used in internal combustion engines according to the patent. The U.S. Pat. to Brooks, No. 1,748,507, shows a process of reducing stable hydrocarbon oils in which ammonia or certain alkaline compounds are mixed with light hydrocarbon oils to prevent discoloration and sedimentation. In two of these U.S. patents, ammonia is used in small amounts in a fuel mixture, which may then be used as a fuel in an internal combustion engine; while in the Drouilly patent, expanded ammonia gas is mixed with another gas to form a gaseous fuel mixture for running an internal combustion engine.

Other prior U.S. patents utilizing ammonia as a fuel include U.S. Pat. No. 3,150,645 which uses a method of operating a compression ignition engine using ammonia as the primary fuel; U.S. Pat. No. 1,384,946 for a composite motor fuel which uses reagents admixed with the fuel to neutralize or destroy the corrosive products of explosive combustion in the engine cylinders, which include among other reagents, ammonia. In U.S. Pat. No. 4,223,642, a small amount of ammonia gas is obtained from ammonia bicarbonate or ammonia carbonate for use in the internal combustion engine. In U.S. Pat. No. 2,140,254 to Zayka, an internal combustion engine is operated on ammonia as a fuel by dissociating a small portion of the ammonia into hydrogen and nitrogen, utilizing exhaust heat, and then adding the dissociated gas back into the ammonia gas to run the engine. The hydrogen apparently extends the flammability limits of the ammonia so that it can be used as a fuel. Ammonia, however, has only half the btu value per pound as gasoline, and therefore, by itself is not considered an efficient fuel. In addition, it's narrow flammability range makes it difficult to use as a fuel.

Other prior art patents can be seen in U.S. Pat. Nos. 4,036,180 and 4,230,072, both to Noguchi, et al., for fuel reforming systems for internal combustion engines reforming methanol; and in U.S. Pat. Nos. 1,899,869 for a gas engine; 4,054,423 for a variable pressure fuel generator and method; and in U.S. Pat. Nos. 3,915,125, 4,121,542 and 3,963,000.

The advantage in using ammonia in the present invention is that ammonia is useful as a convenient means for transporting small volumes of hydrogen since the gas obtained by decomposition contain 75% by volume of hydrogen and 25% by volume of nitrogen. The ammonia is easily liquefied either by cooling to below its normal boiling point of $-33.42°$ C. or by compression and can be stored in a liquid state in small compression cylinders. Ammonia can be thermally dissociated in the presence of certain catalysts to give nitrogen and hydrogen and dissociation can also be affected by photochemical means or by passing an electrical discharge through the gas. Ammonia can be obtained a number of ways, but is normally prepared synthetically by a modification of the Haber process using pressures between 200 and 1,000 atmospheres and temperatures between 400° and 500° C. along with a variety of catalysts. The present invention advantageously can be adapted as an add-on to existing hydrocarbon fueled internal combustion engines, as well as designed for new vehicles and allows a substantial increase in the mileage obtained from the hydrocarbon fuels and a reduction of at least certain pollutants in the exhaust of a vehicle and since the dissociated ammonia is metered in accordance with the requirements of the engine and the leaning of the engine can be similarly controlled, the efficiency can be easily optimized for any particular internal combustion engine.

SUMMARY OF THE INVENTION

An improvement in internal combustion engines is provided in an internal combustion engine having a conventional hydrocarbon fuel-air mixture for producing the internal combustion within the combustion chambers. An ammonia storage tank is used for storing of ammonia in proximity to the internal combustion engine for feeding ammonia from the storage tank to the internal combustion engine with the fuel-air mixture charge. A feed control valve meters the ammonia for varying the rate of feed of the ammonia to the combustion chamber responsive to varying operating conditions of the internal combustion engine while a catalyst and waste engine heat are coupled between the storage tank and the engine. The ammonia gas being fed to the engine combustion chambers allows the internal combustion engine fuel-air mixture to be leaned to a point below the operating limits of the engine using only hydrocarbon fuel.

BRIEF DESCRIPTION OF THE DRAWINGS

Other objects, features and advantages of the present invention will be apparent from the written description and the drawings in which:

FIG. 1 is a diagrammatic view of an internal combustion engine fuel system in accordance with the present invention;

FIG. 2 is a cutaway side elevation of a gas metering valve used in the embodiment of FIG. 1;

FIG. 3 is a side elevation of the throttle connection for the gas metering valve of FIG. 2;

DESCRIPTION OF THE PREFERRED EMBODIMENTS

Figure 4:
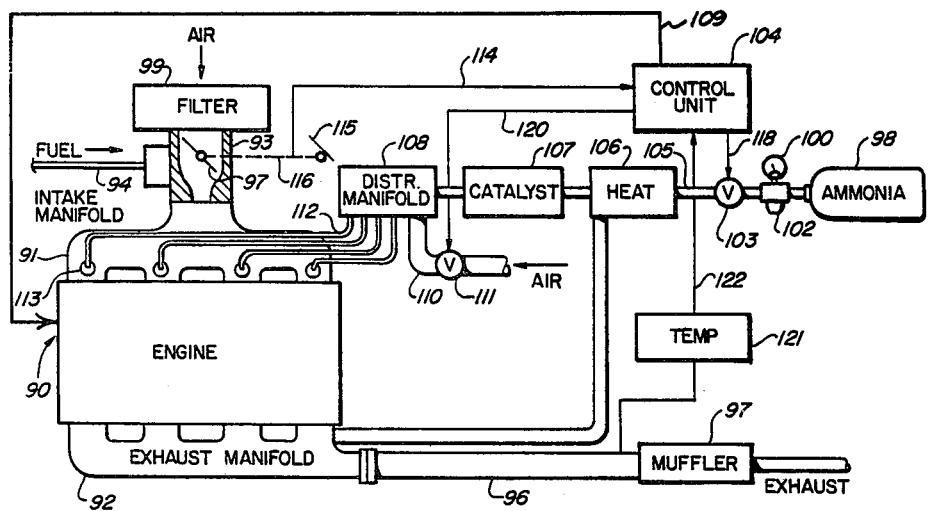
FIG. 4 is a diagrammatical view of a second embodiment of the invention.

Referring to FIGS. 1 through 3 of the drawings, an internal combustion engine (10) is illustrated with a carburetor (11) feeding into an intake manifold connected to the engine block (13), which also has an exhaust manifold (14) connected thereto and a radiator (15) connected to the engine block (13) by water hoses (16, 17). The engine (10) is a standard internal combustion engine using refined hydrocarbon fuels fed from a fuel tank (18) through a gas line (20) to the carburetor (11), and connected by throttle linkage (21) to accelerator pedal (22) located in a vehicle. The exhaust from the exhaust manifold (14) is fed through the tailpipe (23) through a muffler (24) into the atmosphere, and in recent engines might include a catalytic converter as part of a pollution control package. The engine illustrated is a standard internal combustion engine of the type used in vehicles, but the present invention can be easily adapted to an engine having fuel injection rather than a carburetor or to a diesel engine burning oil rather than gasoline.

A tank of anhidrous ammonia (24) is attached to the engine (10) has a pressure gauge (25) and an ammonia safety release valve (26) attached to the ammonia tank (24). The safety release valve is a spring loaded valve which will open momentarily when the pressure exceeds a predetermined pressure, such as 250 psi. Ammonia is stored in the ammonia storage tank (24) in a liquid state, but is fed in a gaseous or liquid state out a line (27) and in a gaseous state into an ammonia dissociator (28) having an enlarged cylinder (30) having a spaced inner cylindrical chamber (31) mounted therein so that exhaust gas coming out of the header (32) passes through the enlarged cylinder (30) into the tailpipe (23), around the inner cylinder (31). The inner chamber (31) is filled with one or more catalysts from a group including iron, nickel, osmium, zinc and uranium. Typically, the catalyst might be iron and nickel, which may be in the form of steel wool, or the like, so that the gas entering the chamber (31) passes therethrough while being heated by the considerable heat of the engine exhaust, so as to utilize the waste exhaust heat for dissociation. In the presence of the catalyst, the dissociation of ammonia begins as low as 300° C. and is nearly complete at 500°-600° C. The ammonia gas enters the dissociator (28) at the input (33) at one end of the chamber (31) while passing through the catalyst. The catalyst baffles the gas and assists in the rapid heating of the gas passing therethrough. The gas in line (34) is substantially dissociated ammonia, 3 parts hydrogen and 1 part nitrogen, but would retain at least traces of ammonia with the disassociated gas. The dissociation of ammonia appears to be analogous to the reverse of the Haber process, which uses high pressure so that it is believed that the negative pressure generated by the intake manifold vacuum enhances the dissociation of the ammonia. Engine (10) has an ignition system including a distributor (19) which is a solenoid (29) connected thereto to advance the spark whenever the solenoid (29) is actuated and to return the spark to normal when the solenoid (29) is switched off. The same switch may initially turn on the ammonia and advance the spark and the switch can be thermostatically activated as shown in connection with FIGS. 4 and 5.

The gases in line (34) are fed to valve (35), the operation which is shown more clearly in FIG. 2. The valve (35) has an air input line (36) and is actuated from a linkage (37) connected to the throttle linkage (21) which is operated by the accelerator pedal (22). The gas from line (34) and the air from the air input line (36) are fed through a line (38) and through individual lines (40) into individual inputs to the intake manifold (12) so as to distribute the air mixed with the dissociated ammonia and any ammonia evenly into each cylinder. The air if fed through line (36) in a controlled ratio and is an easy method of leaning down the normal air to hydrocarbon fuel mixture of the carburetor (11). That is, the more air fed into line (36) and into the intake manifold, the leaner the intake mixture.

The amount of air being fed to the combustion chambers, as well as the amount of dissociated ammonia is actuated through a connection to the throttle linkage (21). The hydrogen input, as well as the amount of leaning, is varied in accordance with the operation of the throttle to give a more efficient mixture of hydrogen, hydrocarbon fuel and air. An alternate ammonia preheater (41) is illustrated connected to a water line (44) and back into the cooling system of the engine (10). A second alternate preheater (49) coils the tube (33) around the exhaust manifold (32) prior to feeding the tube (33) into the catalyst chamber (31). An ammonic inlet line (45) can be connected to the line (27), pass through a coiled pipe or heat exchanger located in the preheater (41) where it is connected to the line (33) feeding into the dissociator (28). The preheater can remove the chill from the rapidly expanding ammonia gas and thereby reduce the total amount of heat that must be provided in the dissociator (28). A preheater can also be made in other ways, such as wrapping the ammonia line around the tailpipe, without departing from the scope of the invention.

Turning to FIG. 2, the valve (35) is illustrated in more detail and has a throttle linkage connection member (47) connected to a throttle linkage member (48), attached to a standard linkage (50). The throttle linkage (47) abuts against a plate (51) which is spring loaded by spring (52) against stop nuts (53). Spring (52) is held in place by members (54, 55). The pressing on the accelerator pedal pushes the throttle linkage (50) and bracket (58) to push the connecting bracket (47), which may be welded or bolted to the bracket (58) to push the plate (51) against spring (52), driving a pair of sliding rods (55, 56). Rod (46) rides in a gas feed housing (57) fed by line (34), as seen in FIG. 1, while sliding rod (55) slides in a housing (58) fed by the air input line (36). Sliding rod (56) may have an O-ring seal (60) and a threaded adjusting rod (61) threaded into the shaft (56). The adjusting rod (61) slides in a chamber (62) and engages a truncated cone valve element (63), which operates in connection with the valve seat (64). The valve element (63) is spring loaded by a spring (65), so that raising or lowering the plate (51) raises or lowers the shaft (56), and threaded member (61) to push against the bottom (69) of the valve element (63) to drive the valve element (63) against the spring (65) thereby opening the valve in proportion to the movement of the throttle linkage to allow gas to pass around the valve seat (64) through a passageway (66) into a T-connection (67) and out line (38). Similarly, lifting of the plate (51) lifts the shaft (55) which has an O-ring seal (68) and a threaded adjusting member (70) which is then threaded into the shaft (55) and will push against the base (71) of a truncated cone valve element (72) operating in conjunction with valve seat (73). The valve element (72) is spring biased by spring (74) in a chamber (75). The shaft (70) passes through a smaller chamber (76) opening to a passageway (77) into the T-connection (67). This side of the valve also has an adjusting valve (78), adjusted with a handle (80) to provide a fixed adjustment for the flow of air from the pipe (36).

In operation, the accelerator pedal (22), of FIG. 1, is operated in a normal manner, but drives the throttle linkage and thereby the bracket (47) attached to throttle plate (48) to raise and lower plate (51) to vary the input of hydrogen, nitrogen and any residual ammonia from the line (34) and the air from the air line (36) into the line (38), which is coupled into the individual intake manifold inlets. The valve (35) is supported by a bracket (81) and a bolt (82) and nut (83) to the carburetor (11).

It should be clear at this point that an ammonia, hydrocarbon fuel and air system has been provided for internal combustion engines. It should also be clear that the system can be adapted for fuel injection systems, and that the dissociator (28) and the catalyst do not have to be in the combined unit as illustrated in FIG. 1, but can be separate units if desired. It should also be clear that a significant increase in the mileage obtained in a standard gasoline engine is believed to be due to the leaning of the engine below the normal misfire limits by the use of dissociated hydrogen, and that the leaned down engine is believed to provide significant improvement in the reduction of at least certain of the pollutants generated by the conventional internal combustion engine, even with the addition of added nitrogen to the engine from the dissociated ammonia. However, ammonia that has not dissociated, as well as added nitrogen, are believed to increase the benefits obtained in combustion.

Figure 5:
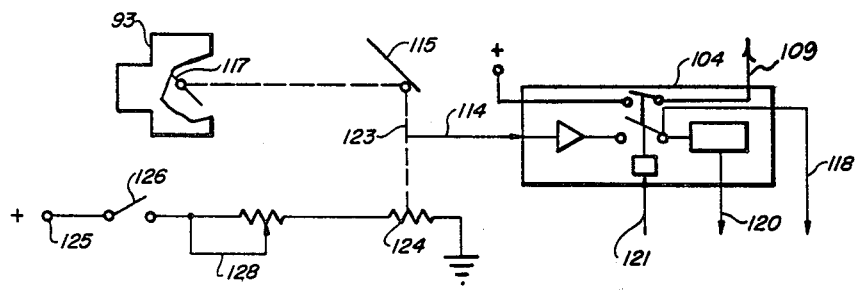
FIG. 5 is a circuit diagram for the electronic control of the valve shown in FIG. 4.

Turning now to FIGS. 4 and 5, a third embodiment of the present invention is illustrated having an internal combustion engine (90) with an intake manifold (91), an exhaust manifold (92) and a standard carburetor (93), having a liquid hydrocarbon fuel line (94) feeding into a fuel bowl (95), forming part of the carburetor (93). Air is fed through an air filter (95) into the carburetor (93)

and into the intake manifold (91) and thus into the combustion chambers of the internal combustion engine (90). While exhaust gases from the combustion chambers is fed through a tailpipe (96), a muffler (97) and into the atmosphere. An ammonia storage tank (98) stores ammonia in a liquefied state and has a pressure gauge (100) and ammonia safety release valve (101) which is adapted to momentarily open when the pressure exceeds the predetermined set pressure and to close after a short opening. The ammonia as a liquid or gas is fed from the cylinder (98) containing liquid ammonia through a line (102) through an electronically controlled fuel valve (103) which varies in accordance with the voltage applied thereto by a central electronic control (104). Ammonia passing through the valve (103) passes through a line (105) into the heating unit (106) capturing heat from the exhaust of the engine. The heating unit is located as close to the combustion cylinders as possible, and may be incorporated into the exhaust header. Ammonia gas also passes through a catalyst (107) which normally would be combined with the heating unit (106) as illustrated in connection with FIG. 1. Ammonia gas from the catalyst (107) is fed into a distribution manifold (108) which is connected to an air inlet (110) through a second electronic controlled valve (111) which meters the air being fed to the distribution manifold (108). The combination of air and at least partially dissociated ammonia is fed through a plurality of gas lines (112) to individual manifold inlets (113) of the intake manifold (91). Thus, in this embodiment, the control unit (104) varies the valves (103, 111) to vary the amount of dissociated ammonia gas and air fed to the intake manifold, thereby varying the input of gas as well as leaning the engine in accordance with the control unit.

The control unit has an electrical conductor (114) which is connected to the accelerator pedal (115) which is connected to the throttle linkage (116) and to the throttle (117). Conductor (114) then feeds a signal that can vary the output voltage or signal through line (118) to the valve (103) and through the line (120) to the valve (111) to open the normally closed valves in proportion to the movement of the throttle. A temperature sensor (121) can be inserted in the exhaust system, such as in the exhaust header, to produce a signal through the line (122) to the control unit (104). A conductor (109) advances the spark of the engine whenever the ammonia is being fed to the engine and this may be done by actuating a solenoid to rotate the distributor a set number of degrees. When the relay in the control unit (104) is opened as shown in FIG. 5, the solenoid is released and the unit returns to normal by retarding the spark.

The control unit (104) can be more clearly understood in connection with FIG. 5, in which the accelerator pedal (115) is connected through a linkage (123) to the movable contact of a potentiometer (124) which is connected from an electrical terminal (125) through the ignition switch (126) through the potentiometer (124) to a ground (127) to thereby vary the voltage in the line (114) to the control unit (104). A variable resistance (128) can be used to determine the minimum value of the signal of the moving contact of the potentiometer (124). The control unit (104) includes a standard amplifier for amplifying the signal from the line (114) as well as a relay or solenoid switch actuated by the thermal sensor (122). The thermal switch disables the control unit (104) until a sufficient temperature is reached in the exhaust manifold. This prevents ammonia and air from being fed to the unit until sufficient heat is available to dissociate a portion of the ammonia. A momentary delay circuit can momentarily delay the signal in the line (120) to the valve (111) to assure that the air and ammonia gas will reach the distribution manifold (108) at the same time, so as not to momentarily lean the engine (90) down, prior to dissociated ammonia being fed to the engine.

A simplified electrical control embodiment of the invention has been illustrated in connection with FIGS. 4 and 5, but it should be clear that the next generation control unit would typically include a microprocessor, receiving signals not only from the throttle, but may include an exhaust sensor which changes it's electrical conductivity corresponding to the concentration of certain exhaust gases, oxygen or hydrogen over the sensor. In addition, exhaust gas control systems such as are commonly used on airplanes may be adapted for use in the control unit, along with sensors indicating engine speed and intake manifold pressure, which input signals can produce an optimum control of the feeding of dissociated ammonia and air to the engine (90) even if the desired feed in non linear. It should be clear that the feeding of air for leaning the engine (90) is easily accomplished for add-on units for adding onto existing internal combustion engines (90), but that the engine can also be leaned through specially designed carburetors without departing from the spirit and scope of the invention. A custom designed carburetor or fuel injection unit might also include the control of the feed of the ammonia with the fuel-air mixture leaned in a different manner without departing from the spirit and scope of the invention. Similarly, the control of the unit of a fuel injection engine can be operated in conjunction with the control of the injectors. It should also be clear that the engine can be switched over entirely to dissociated ammonia.

Accordingly, the present invention is not to be construed as limited to the forms shown herein, which are to be considered illustrative rather than restrictive.

I claim:

1. An improvement in internal combustion engines characterized by:

an internal combustion engine having fuel feed means for feeding a hydrocarbon fuel-air mixture to at least one combustion chamber, said engine having an ignition system and an exhaust system for feeding exhaust gases from said internal combustion engine and a cooling system for cooling said engine;

ammonia storage means for storing ammonia in proximity to said internal combustion engine;

ammonia feed means for feeding ammonia from said ammonia storage means to said engine combustion chamber with said fuel-air mixture charge;

means coupled to said ammonia feed means between said ammonia storage means and said internal combustion engine for dissociating said ammonia into hydrogen and nitrogen and feeding said gas to said engine with the hydrocarbon fuel-air mixture, whereby ammonia is fed into a combustion chamber substantially dissociated;

feed control valve means connected to said ammonia feed means for varying rate of feed of said ammonia to said combustion chamber responsive to operating conditions of said internal combustion engine;

means to control the hydrocarbon fuel-air mixture of said internal combustion engine so as to be leaned below a normal hydrocarbon fuel-air operating range when ammonia is being dissociated and fed from said ammonia storage means by said ammonia feed means to said internal combustion engine in accordance with said rate of feed of said ammonia; and means to switch said internal combustion engine to said normal hydrocarbon fuel-air operating range in response to said ammonia dissociation means having insufficient heat to dissociate the ammonia; and means to advance the ignition system spark upon the hydrocarbon air-fuel being leaned by said engine control means and to retard the ignition system spark upon said hydrocarbon air-fuel being switched to said normal hydrocarbon fuel-air operating range.

2. An internal combustion engine in accordance with claim 1, in which the dissociating means is coupled to said internal combustion engine to heat ammonia passing therethrough above 300 C.

3. An internal combustion engine in accordance with claim 1, further characterized by an ammonia preheater connected to said internal combustion engine cooling system to preheat said ammonia prior to heating said ammonia in said dissociation means.

4. An internal combustion engine in accordance with claim 1, in which said means to control said internal combustion engine includes an air feed means for feeding additional air into said intake system of said engine.

5. An internal combustion engine in accordance with claim 4, in which said means to control the fuel-air mixture to said engine includes feeding air mixed with dissociated ammonia gas into the intake system intake manifold of said internal combustion engine.

6. An internal combustion engine in accordance with claim 5, in which dissociation means has heating means having a chamber mounted for the engine exhaust gases to pass therearound and having a connection for feeding ammonia in one end portion of said chamber and dissociated ammonia out the other end portion of said chamber, said chamber having the catalyst therein.

7. An internal combustion engine in accordance with claim 6, in which said catalyst includes iron.

8. An internal combustion engine in accordance with claim 6, in which said catalyst includes nickel.

* * * * *